April 18, 1961  E. R. CONOVER, JR  2,980,078
REVERSING PNEUMATIC MOTOR

Filed April 1, 1957  2 Sheets-Sheet 1

INVENTOR.
ERNEST R. CONOVER, JR.
BY
RICHEY, WATTS, EDGERTON,
McNENNY & FARRINGTON.
ATTORNEYS

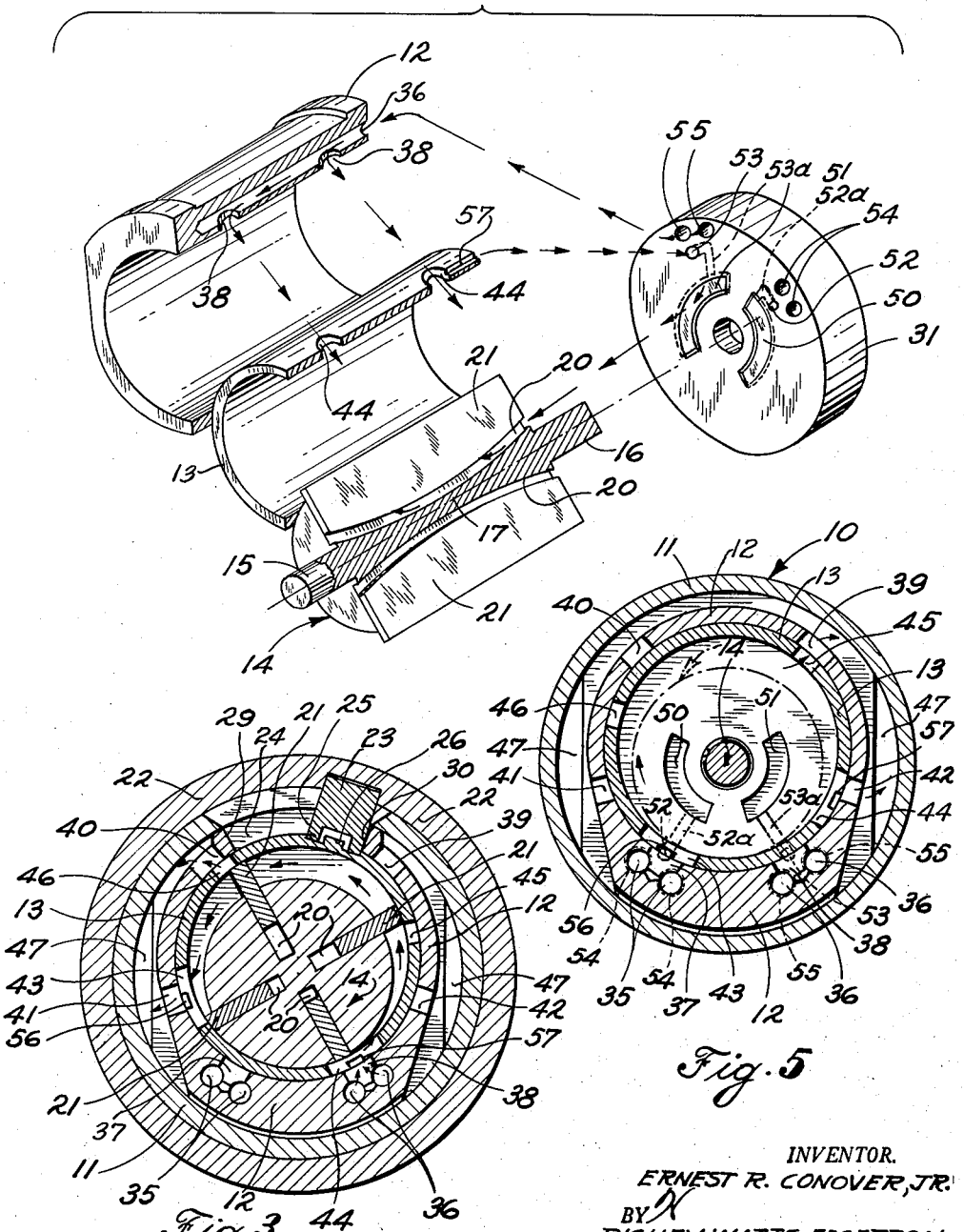

United States Patent Office 2,980,078
Patented Apr. 18, 1961

2,980,078

REVERSING PNEUMATIC MOTOR

Ernest R. Conover, Jr., Aurora, Ohio, assignor, by mesne assignments, to Master Power Corporation, Bedford, Ohio, a corporation of Maryland Filed Apr. 1, 1957, Ser. No. 649,838

8 Claims. (Cl. 121—87)

This invention relates generally to reversible pneumatic motors of the type particularly adapted to be used in power tools such as screwdrivers, wrenches and the like. More particularly, the invention relates to an improvement in reversible pneumatic motors which provide full expansion when operated in either direction, such as the motor disclosed in U.S. Patent No. 2,715,889, issued August 23, 1955.

Pneumatic motors having blades slidable in slots in a rotor eccentrically mounted in a cylindrical stator have been provided with passages connecting the compressed air inlet with the blade slots on the inlet side to press the blades outwardly into sealing engagement with the stator so as to provide adequate starting torque. In the usual reversible pneumatic motors, two inlet ports are provided, one on each side of the tangent point between the rotor and the stator, with an exhaust port located diametrically opposite the tangent point, so that the rotor can be driven in either direction by connecting one inlet port to the compressed air supply and the other to exhaust. In such motors, opposed arcuate slots in a motor end plate can be used to connect the inlet ports to the blade slots in the rotor so that the blade slots on the inlet side are connected to the compressed air supply and on the opposite side to exhaust, regardless of the direction of rotation.

Such motors, however, open each expansible chamber between adjacent blades to the main exhaust port when the leading blade of a chamber passes the main exhaust, so that relatively little expansion of the air can occur between the closing of the inlet and the opening of the exhaust. Full expansion with consequently greatly increased efficiency is obtained in the reversible motor disclosed in Patent No. 2,715,889 by means of a reversing sleeve forming an inner liner of the cylindrical stator and movable to forward and reverse positions in each of which the sleeve opens ports from an inlet passageway positioned to effect rotation in the desired direction, a main exhaust port positioned substantially full expansion and a final exhaust port at the point where the expansible chambers approach their minimum volume. In motors of this type the usual arrangement of arcuate slots connected to the two inlet passages and to the blade slots in the rotor cannot be used because the arcuate slot on the exhaust side would bleed the compressed air supply to exhaust.

The principal object of the present invention is to supply compressed air to the blade slots only on the inlet side of the rotor in a pneumatic motor which may be reversed by means of a movable sleeve.

Other objects are to supply compressed air to the blade slots on the inlet side and cut the compressed air off from the exhaust side, in either direction of rotation by means controlled by the movable reversing sleeve, so that the movement of the single control member serves to reverse the motor and also reverse the supply of compressed air to the blade slots in the rotor.

Other objects and advantages of the invention will appear in the following detailed description of a preferred embodiment of the invention.

In the accompanying drawings:

Fig. 3 is a view corresponding to Fig. 2 showing the motor operating in a counterclockwise direction;

Figure 1:
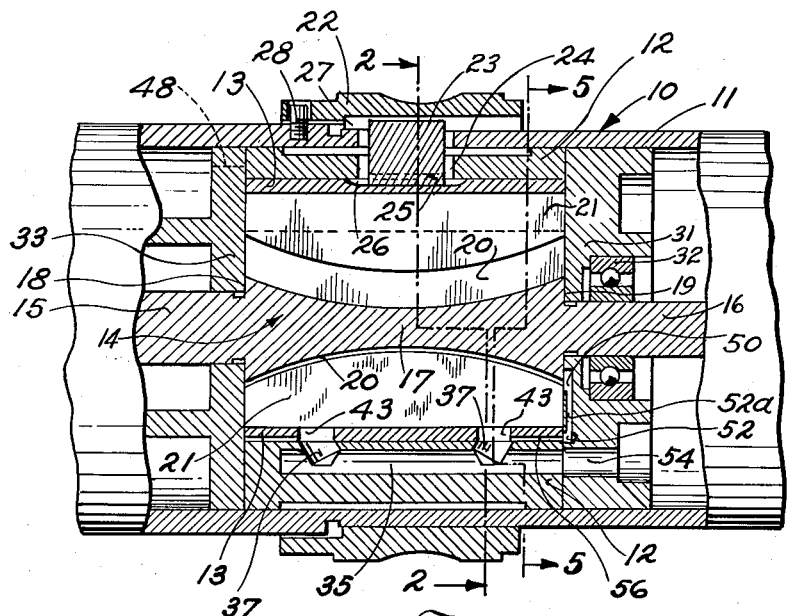
Fig. 1 is a partial longitudinal section through a reversible pneumatic motor illustrating my invention.

Fig. 4 is a fragmentary schematic view of the motor end plate, rotor, reversing sleeve and stator in which the path of the travel of the air from the end plate through the various parts to the blade slots in the rotor is illustrated; and Fig. 5 is a cross-section taken substantially on the line 5—5 of Fig. 1 with the rotor and blades omitted, showing the reversing sleeve in position to effect operation of the motor in a clockwise direction.

In the drawings, a reversible fluid motor incorporating this invention is shown. The numeral 10 refers generally to the motor mounted in a tubular housing 11, and includes a stator 12, a reversing valve sleeve 13, and a rotor 14. The rotor 14 is provided with extended shaft portions 15 and 16 and a central cylindrical portion 17 terminating in shoulders 18 and 19. The central cylindrical portion 17 is formed with a series of axially extending slots 20, four in the illustrated embodiment, which open through the cylindrical surface and through the shoulders 18 and 19. Blades 21 fit slidably in the slots 20. The axial length of the blades 21 is equal to the axial length of the central cylindrical portion 17 of the rotor, and the radial width of the blades 21 does not exceed the radial depth of the slots 20.

The reversing sleeve 13 fits rotatably in an eccentric bore in the stator 12, the eccentricity being such that the central cylindrical portion 17 of the rotor substantially contacts the inner surface of the sleeve 13 at a tangent point, and the blades 21 may slide outwardly in the slots 20 so that their outer edges contact the inner surface of the sleeve 13 at any point in its circumference without permitting the blades 21 to escape from the slots 20. Preferably the inner edges of the blades 21 and the bottoms of the slots 20 are arcuate in shape as illustrated to provide maximum bearing area between the blades and the rotor.

An operating collar 22 surrounding the motor housing 11 and adapted to be rotated therearound is connected to the reversing sleeve 13 in such a manner as to rotate the sleeve 13 to either of its two operating positions when the external collar 22 is rotated. In the illustrated embodiment this connection is provided by a block 23 projecting through an arcuate slot 24 cut through the wall of the stator 12 and through the tubular housing 11, the block 23 being formed on its inner end with spline teeth 25 fitting in grooves 26 on the outer periphery of the reversing sleeve 13. The outer end of the block 23 projects through the slot 24 and fits slidably in an axially extending groove 27 cut in the inner surface of the operating collar 22. Any suitable means such as a set screw 28 extending through an arcuate slot in the collar 22 may be used to retain the collar against axial movement. Since the reversing sleeve 13 and the operating collar 22 are eccentric with respect to each other, radial movement occurs between the block 23 and the operating collar 22 when the collar and sleeve are rotated. Such movement is accommodated by the sliding fit of the outer end of the block 23 in the groove 27. The ends 29 and 30 of the arcuate slot 24 in the stator 12 are adapted to engage the block 23 and limit the rotational movement of the sleeve 13 and collar 22.

A motor end plate 31 in the housing 11 engages one end of the stator 12 and has sealing engagement against the relatively rotatable end edge of the sleeve 13, the shoulder 19 of the rotor 14 and the adjacent ends of the slidable blades 21. The end plate 31 carries a ball bearing 32 in which the extended central shaft 16 of the rotor 14 is journaled. Another motor end plate 33 is secured in the housing 11 engaging the opposite end of the stator 12 and has sealing engagement against the opposite end of the sleeve 13, the shoulder 18 of the rotor and the adjacent ends of the blades 21. The end plate 33 is provided with a suitable bearing journaling the extended central shaft 15 of the rotor 14.

The stator 12 is provided with longitudinal inlet bores 35 and 36 adapted to be supplied with compressed air from any suitable source, and is also provided with ports 37 and 38 leading to the reversing valve sleeve 13 from the bores 35 and 36 respectively. The stator 12 is also formed with main exhaust ports 39 and 40, and final exhaust ports 41 and 42. The reversing valve sleeve 13 is provided with ports 43 and 44 serving alternately as inlet and final exhaust ports to and from the rotor 14, according to the position of the reversing valve sleeve 13, and is also provided with ports 45 and 46 alternating serving as a main exhaust port when the motor rotates in one direction and being covered when it rotates in the opposite direction. When the reversing valve sleeve 13 is in the position illustrated in Fig. 2, high pressure air passes from bores 35 in the stator 12 through ports 37 and through sleeve port 43 leading to the rotor 14. The circumferential space between each two adjacent blades 21 constitutes an expansible chamber which receives air at the inlet pressure until the trailing blade passes the inlet port 43, after which the air expands and continues to force the rotor clockwise until the leading blade of the chamber reaches the exhaust port 45, at which time the chamber is exhausted to atmosphere through the ports 45 and 39 into an exhaust passage 47 formed between the housing 11 and stator 12 and out through exhaust ports 48 in the motor end plate 33. Air at atmospheric pressure trapped in each chamber after the trailing blade thereof passes exhaust port 45 escapes through final exhaust ports 44 and 42 into the passage 47.

When the reversing sleeve 13 is in the position illustrated in Fig. 3, high pressure air passes from bores 36 in the stator 12 through ports 38, through sleeve port 44 leading to the rotor 14, the blades 21 being rotated in a counterclockwise direction as viewed in Fig. 3. The exhausted air, after driving the blades 21, passes through sleeve ports 46 and 43, and stator ports 40 and 41, and then through exhaust passage 47 and out ports 48.

On starting the motor, it is necessary to press the blades radially outward against the inner wall of the motor chamber in order to obtain any substantial starting torque. According to the present invention, this is accomplished by air passages valved by the reversing sleeve 13 to admit air to the blade slots within the inner edges of the blades on the inlet side only, and to seal off the air passages on the exhaust side, for operation of the motor in either direction. Preferably such air passages are formed in either or both of the motor end plates 31 and 33. For simplicity, the passages are illustrated in the end plate 31.

The inner face of the motor end plate 31 is provided with arcuate slots 50 and 51 disposed outwardly of the rotor shaft 15 a short distance, while ports 52 and 53 are connected by radially extending bores 52a and 53a with slots 50 and 51 respectively, as shown in Figs. 4 and 5. The arcuate slots 50 and 51 communicate with the blade slots 20 which open through the shoulder 19 at the adjacent end of the rotor, and are positioned to open into the slots 20 behind the inner edges of the blades 21. The end plate 31 is also provided with inlet bores 54 and 55 aligned with the bores 35 and 36, respectively, in the stator 12. Such inlet bores, like the arcuate slots 50 and 51 may, of course, be in either or both of the end plates 31 and 33.

Axially extending grooves 56 and 57 are formed in the outer surface of the reversing sleeve 13. The grooves 56 and 57 communicate with the ports 43 and 44, respectively, and open through the end edge of the sleeve 13 which fits snugly against the motor end plate 31.

Figure 2:
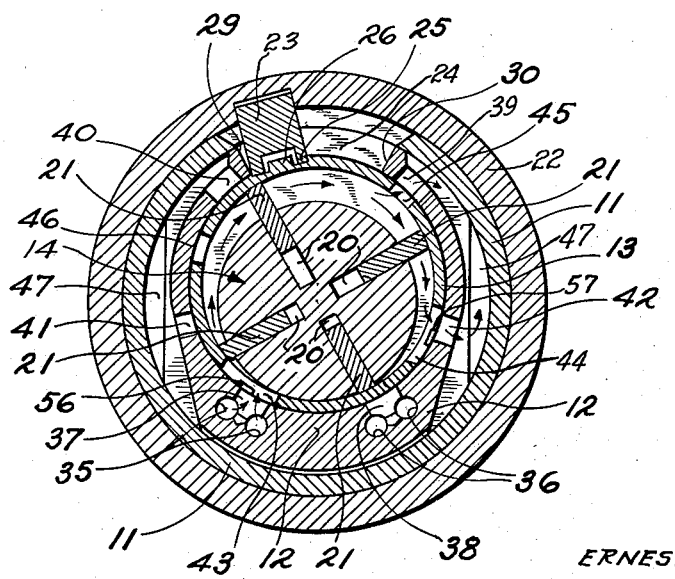
Fig. 2 is a cross-sectional view taken on the line 2—2 of Fig. 1, illustrating the motor operating in a clockwise direction.

When the reversing sleeve 13 is in the position shown in Figs. 2 and 5, the sleeve ports 43 are aligned with the inlet ports 37 leading from the inlet bores 35. The axial slot 56 leading from the port 43 in the outer surface of the sleeve 13 also communicates at its free end with the end of the radial slot 52. Thus high pressure inlet air admitted to the stator inlet bores 35 from the bores 54 in the end plate 31 is admitted to the rotor to produce clockwise rotation, as seen in Figs. 2 and 5, and is also admitted to the inner ends of the blade slots 20 which are in communication with the arcuate slot 50.

If the blades 21 should happen to be spaced from the inner cylindrical surface of the sleeve 13 when inlet air is first admitted, the air entering the sleeve through the ports 43 would simply blow past the outer edges of the blades 21 and escape through the exhaust ports if no means were provided to seal the outer edges of the blades against the inner surface of the sleeve 13.

To prevent such escape of the air, and to provide maximum starting torque, the inlet air from the ports 43 is also admitted through the axial slot 56 in the outer surface of the sleeve 13, the radial slot 52a and the arcuate slot 50 to the inner ends of the blade slots 20 which are in registration with the arcuate slot 50 so as to force the blades 21 on the inlet side radially outward against the inner surface of the sleeve 13. This air pressure seals each blade 21 against the inner surface of the sleeve 13 from the time it first reaches the inlet ports 43 until it has turned out of registration with the arcuate slot 50 which occurs immediately after the following blade has passed the inlet ports 43. Thus, the leading and trailing blades of each successive expansible chamber are sealed against the sleeve 13 so long as that chamber is open to the inlet.

At the same time, the arcuate slot on the exhaust side is cut off from the inlet air. Thus in the position of the sleeve shown in Figs. 2 and 5 the sleeve port 44 is in registration with the final exhaust port 42 and the axial slot 57 which communicates with the sleeve port 44 has been moved out of registration with the radial slot 53. Thus high pressure air in the blade slots 20 may bleed past the blades 21, which are freely slidable, and may also leak out to exhaust directly from the radial slot 53 into the space between the rotor 14 and the inner surface of the sleeve 13, thus facilitating the return of the blades to their radially inward position without excessive pressure against the sleeve 13 and avoiding wastage of compressed air on the exhaust side.

When the collar 22 and sleeve 13 are turned to the position shown in Fig. 3 to drive the rotor in a counterclockwise direction, the connections are reversed, the arcuate slot 51 being open to inlet air pressure through the radial slot 53 and the axial slot 57 communicating with the sleeve port 44. At the same time, the axial slot 56 has been moved out of registration with the radial slot 52 so that the arcuate slot 50 is disconnected from the inlet pressure and may bleed to exhaust.

As soon as the rotor has been accelerated to its running speed in either direction, centrifugal force holds the blades sealed against the inner surface of the sleeve 13, but when the rotor is first started or is rotating at a relatively slow speed the air pressure admitted behind the inner edges of the blades keeps the blades sealed to maintain maximum torque.

While a preferred embodiment of the invention has been described in considerable detail, it is to be understood that various modifications and rearrangement of the parts may be resorted to without departing from the scope of the invention as defined in the following claims.

I claim:
1. In a pneumatic motor, an annular stator having spaced inlet passages located for forward and reverse operation of the motor, a reversing sleeve movably mounted in said stator, an eccentric rotor in said sleeve having axially extending slots, blades movably mounted in said slots and engaging the inner surface of said sleeve, an end plate having spaced openings communicating, respectively, with the inner ends of different ones of said slots, said reversing sleeve being formed with ports controlling air flow through selected ones of said inlet passages against selected ones of said blades and with other passages positioned to connect those openings communicating with slots accommodating said selected blades alternately to said selected inlet passages.

2. In a pneumatic motor, a body defining a cylinder, said body comprising a stator and a relatively movable reversing sleeve co-axial therewith and movable to forward and reverse position, a slotted rotor in said cylinder with its axis parallel with and offset from the axis of said cylinder, blades slidably mounted in the slots of said rotor and slidably engaging said cylinder, end plates closing said cylinder and slidably engaging the end edges of said blades, said body being formed with inlet and exhaust passages on each side of a plane through the axes of said cylinder and said rotor, said passages extending through said stator and said reversing sleeve and arranged so that in either position of said reversing sleeve the inlet is opened to the cylinder and the exhaust is closed on one side of said plane, and the inlet is closed and the exhaust opened on the other side, one of said end plates being formed with spaced openings on opposite sides of said plane communicating with the inner ends of the slots in said rotor, said reversing sleeve having other passages communicating with one of said openings in either position of said sleeve, said other passages connecting the opening to the inlet on the side on which the inlet is opened, and isolating the opening from the inlet on the other side.

3. In a pneumatic motor, a body defining a cylinder, said body comprising a stator and a relatively movable reversing sleeve co-axial therewith and movable to forward and reverse position, a slotted rotor in said cylinder with its axis parallel with and offset from the axis of said cylinder, blades slidably mounted in the slots of said rotor and slidably engaging said cylinder, end plates closing said cylinder and slidably engaging the end edges of said blades, said body being formed with inlet and exhaust passages positioned only on opposite sides of a plane through the axes of said cylinder and said rotor, said passages extending through said stator and said reversing sleeve and arranged so that in either position of said reversing sleeve the inlet is opened to the cylinder and the exhaust is closed on one side of said plane, and the inlet is closed and the exhaust opened on the other side, one of said end plates being formed with spaced openings on opposite sides of said plane communicating with the inner ends of the slots in said rotor, said reversing sleeve having other passages communicating with one of said openings in either position of said sleeve, said other passages connecting the opening to the inlet on the side on which the inlet is opened to the cylinder, and isolating the opening from the inlet on the other side.

4. In a pneumatic motor, a body defining a cylinder, said body comprising a stator and a relatively movable reversing sleeve co-axial therewith and movable to forward and reverse position, a slotted rotor in said cylinder with its axis parallel with and offset from the axis of said cylinder, angularly spaced blades slidably mounted in the slots of said rotor and slidably engaging said cylinder, end plates closing said cylinder and slidably engaging the end edges of said blades, said body being formed with inlet and exhaust passages on each side of a plane through the axes of said cylinder and said rotor, said passages extending through said stator and said reversing sleeve and arranged so that in either position of said reversing sleeve the inlet is opened to the cylinder and the exhaust is closed on one side of said plane, and the inlet is closed and the exhaust opened on the other side, one of said end plates being formed with spaced openings on opposite sides of said plane communicating with the inner ends of the slots in said rotor, said reversing sleeve having other passages communicating with one of said openings in either position of said sleeve, said other passages connecting the opening to the inlet on the side on which the inlet is opened to the cylinder, and isolating the opening from the inlet on the other side, each of said openings communicating with said slots through an angular extent as great as the angular spacing of said blades.

5. In a pneumatic motor a cylinder body comprising an annular stator having inlet passages and a relatively movable reversing sleeve co-axial therewith, an eccentric rotor in said body having axially extending slots, blades slidably mounted in said slots, an end plate having spaced openings communicating with the inner ends of the adjacent ones of said slots, said reversing sleeve being formed with ports controlling said inlet passages for forward and reverse operation of the motor, said reversing sleeve being formed with other passages positioned to connect the one of said openings communicating with the slots on the inlet side of the motor to an inlet passage and to isolate the other of said openings from said inlet passages in both forward and reverse operation of the motor.

6. In a pneumatic motor, a cylinder body comprising an annular stator having inlet and exhaust passages and a relatively rotatable reversing sleeve co-axial therewith and movable alternatively to forward and reverse positions, an eccentric rotor in said cylinder body having axially extending slots, blades slidably mounted in said slots and engaging the inner surface of said cylinder body, an end plate slidably engaging end edges of said blades and having spaced openings communicating with the inner ends of said slots, said reversing sleeve being formed with ports controlling said inlet and exhaust passages and with other passages positioned to connect said openings alternatively to inlet passages.

7. In a pneumatic motor including a cylinder body having inlet and exhaust passages and comprising a stator and a reversing sleeve movable to either of two positions, a slotted eccentric rotor in said body, blades slidably mounted in the slots of said rotor and an end plate engaging an end surface of said rotor and end edges of said blades; the improvement comprising said end plate being formed with spaced openings communicating with the inner ends of the slots in said rotor on opposite sides of a plane through the axes of said rotor and said cylinder body, said motor having passages controlled by said reversing sleeve connecting one of said openings to, and isolating the other from, said inlet passage in one position of said sleeve, and isolating said one opening from, and connecting said other to, said inlet passage in the other position of said sleeve.

8. A pneumatic motor comprising a cylindrical housing, a stator in said housing having a cylindrical bore with its axis parallel to and offset from the axis of said housing, a reversing sleeve co-axial with said bore rotatably mounted therein, an operating collar slidably fitting about the exterior of said housing, said collar being co-axial with said housing and eccentric with respect to said stator bore, said stator having an arcuate slot therethrough, and a block connected to said sleeve projecting radially outward through said slot, said block being arcuately movable from one end to the other of said slot to shift said sleeve with respect to said stator, said block having sufficient radial extent to project beyond said housing in all arcuate positions of said block within said slot, said collar having an axial groove on its inner surface receiving the outer end of said block for radial sliding movement therein, said groove having sufficient depth to engage said block in all arcuate positions of said block within said slot.

References Cited in the file of this patent

UNITED STATES PATENTS

| | | |
|---|---|---|
| 2,103,180 | Rice | Dec. 21, 1937 |
| 2,257,892 | Van Sittert et al. | Oct. 7, 1941 |
| 2,660,123 | Vlachos | Nov. 24 1953 |
| 2,715,889 | Sturrock | Aug. 23, 1955 |
| 2,777,396 | Adams et al. | Jan. 15 1957 |

FOREIGN PATENTS

| | | |
|---|---|---|
| 528,034 | Great Britain | Oct. 21, 1940 |